United States Patent [19]

Smith

[11] Patent Number: 4,492,470
[45] Date of Patent: Jan. 8, 1985

[54] MEASURING MICROSCOPE
[75] Inventor: Francis H. Smith, York, England
[73] Assignee: Vickers Limited, London, England
[21] Appl. No.: 353,207
[22] Filed: Mar. 1, 1982

Related U.S. Application Data

[63] Continuation-in-part of Ser. No. 060,868, Jul. 26, 1979, abandoned.

[30] Foreign Application Priority Data

Jul. 26, 1978 [GB] United Kingdom ............... 31185/78
Dec. 20, 1978 [GB] United Kingdom ............... 49229/78

[51] Int. Cl.³ .............................................. G01B 11/00
[52] U.S. Cl. ..................................... 356/372; 356/384
[58] Field of Search ............... 356/372, 379, 384, 390, 356/11, 12, 22; 350/172, 312

[56] References Cited

U.S. PATENT DOCUMENTS

| | | | |
|---|---|---|---|
| 587,443 | 8/1897 | Konig | 356/22 |
| 1,649,106 | 11/1927 | Eppenstein | 356/384 |
| 2,730,008 | 1/1956 | McGinn | 350/401 |
| 3,031,916 | 5/1962 | Burns | 356/376 |
| 3,326,079 | 6/1967 | Dyson et al. | 356/384 |
| 4,088,410 | 5/1978 | Smith | 356/390 |

FOREIGN PATENT DOCUMENTS 1058627 3/1954 France ................................. 356/22

Primary Examiner—R. A. Rosenberger
Attorney, Agent, or Firm—Browdy and Neimark

[57] ABSTRACT

In a measuring microscope for measuring the distance between line elements of an optical image, means are provided for forming from an image-carrying beam, carrying the optical image, further image beams in which light of respective complementary regions of the image-carrying beam is suppressed, to form respective distinct non-overlapping but adjacent image portions for viewing. Means are provided for then carrying out calibrated displacement of the adjacent image portions. Thus, a line element in one image portion can be brought into alignment with a line element of an adjacent image portion. The degree of calibrated adjustment required for this gives a measure of the distance between the two line elements on the object which is imaged.

The microscope may be constituted so that means involved in the suppression of complementary regions of the image-carrying beam are readily removable so that overlapping images can be provided for viewing.

12 Claims, 9 Drawing Figures

MEASURING MICROSCOPE

This is a continuation-in-part of application Ser. No. 060,868, filed July 26, 1979, now abandoned.

There are known measuring microscopes using amplitude division to split an image-carrying beam, bearing an image of an object, to derive two beams to provide two images of the object in the same field of view.

The microscope of United Kingdom Patent Specification No. 1,028,302 uses a partially reflecting optical face of a glass block to achieve amplitide division of an image-carrying beam, and the two split beams thus provided are reflected by mirrors and within a prism to present two images of an object in the observer's field of view.

The microscope of U.S. Pat. No. 3,326,079 uses a partially metallised interface between glass prisms to achieve ampltidue division of an image-carrying beam and the two split beams thus provided are reflected at surfaces of rhomboidal prisms to present two images of an object in the observer's field of view.

A microscope disclosed in U.S. Pat. No. 2,730,008 uses a birefringent crystal to achieve amplitude division of an image-carrying beam and the two split beams thus provided are viewed directly by the observer in an eyepiece.

In such microscopes the two images provided by the split beams are duplicates of one another. In a null position the two images can be superposed. The two images may, however, be laterally displaced one relative to the other, providing two sheared images each a duplicate of the other in the observer's field of view.

When the two sheared images of an object are brought into a state of tangency, in which opposite edges of an object as seen in the two images just touch or fuse, the amount of shear required to bring about this state is a measure of the size of the object.

Such image-shearing is a well established method for the precise and accurate measurement of the width of light-absorbing, incoherently illuminated objects. In the present context, "incoherently illuminated" means illuminated by rays whose angular range (at the object) is substantially greater than the angular range of the rays accepted by the optical system employed to image the object. For this condition it has been proved that the level of illumination at the true, geometrical image of an absorbing object's edge is the mean of the illumination levels respectively inside and outside that edge. For example, if the object is fully opaque, then the level of illumination at the geometrical image of its edge is 50% of the back-ground illumination. This is conveniently referred to as the half-power point. Thus, when an image shearing measuring microscope system is adjusted in such a way that the two sheared images just fuse into each other, then the amount of imparted shear is a measure of the imaged object's size. However, the condition of incoherent illumination required to achieve this ideal result is not practicable for the higher objective numerical apertures needed for the measurement of very small objects. A half-micron wide object needs an objective aperture of at least 0.9 N.A, and it is not possible for the illuminating condenser's N.A greatly to exceed this value.

In practice, therefore, one is often forced to accept a form of illumination in which there is insufficient incoherence for the half-power point to correspond with the object's geometrical (true) edge (a condition known as partial coherence). Consequently, when a shearing device is adjusted to achieve the above, fused condition (at which, of course, the half-power points are mutually superposed) the imparted shear is no longer precisely related to the object's size. This effect is known as coherence error and is due to mutual optical interference between the direct back-ground light and light scattered by the object's edge.

A similar, though more complex, interference effect also displaces the apparent images of the edges of transparent and partially transparent objects, such as stencil patterns formed on silicon wafers, causing measurement errors both for image-shearing and conventional micrometer methods.

This disturbing contribution from the back-ground light can be avoided by recourse to one of the well-known dark-ground illumination techniques, in which the edges appear as bright lines on a dark back-ground. Each such bright line is then the focus of the light which has been scattered by the edge so that its position corresponds to the "true" edge. In principle, therefore, dark-ground illumination offers a means for obviating the coherence error. When the relevant edges of a narrow object are close enough for their corresponding line images mutually to interfere then their apparent positions are slightly modified but it is practicable to calculate a correction factor from the known effective numerical apertures of the dark-ground illumination and that of the microscope objective. In a less familiar method known as central dark-ground illumination, the object's edge appears as a dark line super-imposed upon a relatively bright adjacent banded back-ground.

It will be noted that in either case the object's edge appears as a line. Now experience has shown that although an image-shearing device can be adjusted so as to measure an object's width by superimposing such lines, it is not possible to do so with anything like the high setting position (i.e. the ability to repeat precisely a given reading under constant conditions) routinely achieved with the normal, light-ground illumination shearing method.

The images of many objects contain fine lines which closely define the edges of the specimen-features to be measured, when appropriate methods of illumination are used. For example, when the photo-resist stencil pattern on the surface of a silicon wafer is imaged by a conventional incident light microscope, the edges of the stencil pattern appear as dark lines on a relatively bright background. In incident dark-ground illumination, the situation would be reversed, the lines then appearing bright on a dark back-ground. For most specimens, it is usually possible to choose an illumination technique which causes the specimen edges to be imaged as light or dark lines.

This specification discloses instrumentation for the precise measurement of the lateral distance between such lines in an optical image by appropriate exploitation of the eye's well-known high vernier acuity. The latter phrase refers to the eye's ability to detect an abrupt, localized displacement of a line. Under ideal conditions, a displacement of only 6 seconds of an arc is detectable. By exploiting this ability the precision with which one line-image can be brought into registration with another such image is enhanced.

According to the present invention there is provided a measuring microscope, for measuring the distance between line elements of an optical image, the microscope comprising:

optical means, including amplitude dividing means, for providing from an image-carrying beam, bearing only the said optical image, image beams in which light of respective, complementary, regions of the said image-carrying beam is suppressed, to form respective distinct non-overlapping but adjacent image portions for viewing; and adjustment means for carrying out calibrated displacement of the image portions relative to one another.

According to the present invention there is further provided a measuring microscope, for measuring the distance between the line elements of an optical image, the microscope comprising:

amplitude dividing means arranged to receive an image-carrying beam, bearing only the said optical image, and to provide therefrom mutually shearable image beams;

suppression means arranged in the paths of the shearable image beams to suppress respective complementary regions of the shearable image beams, to form respective non-overlapping but adjacent image portions for viewing; and adjustment means for carrying out calibrated displacement of the image portions relative to one another.

The suppression means may advantageously be removeable from the paths of the shearable image beams, so that the microscope can be used in a normal image shearing mode with two overlapping images provided for viewing.

To assist in understanding the invention and to show how it may be carried out, some embodiments thereof will now be described, by way of example, with reference to the accompanying diagrammatic drawings, in which:

Figures 1, 2:
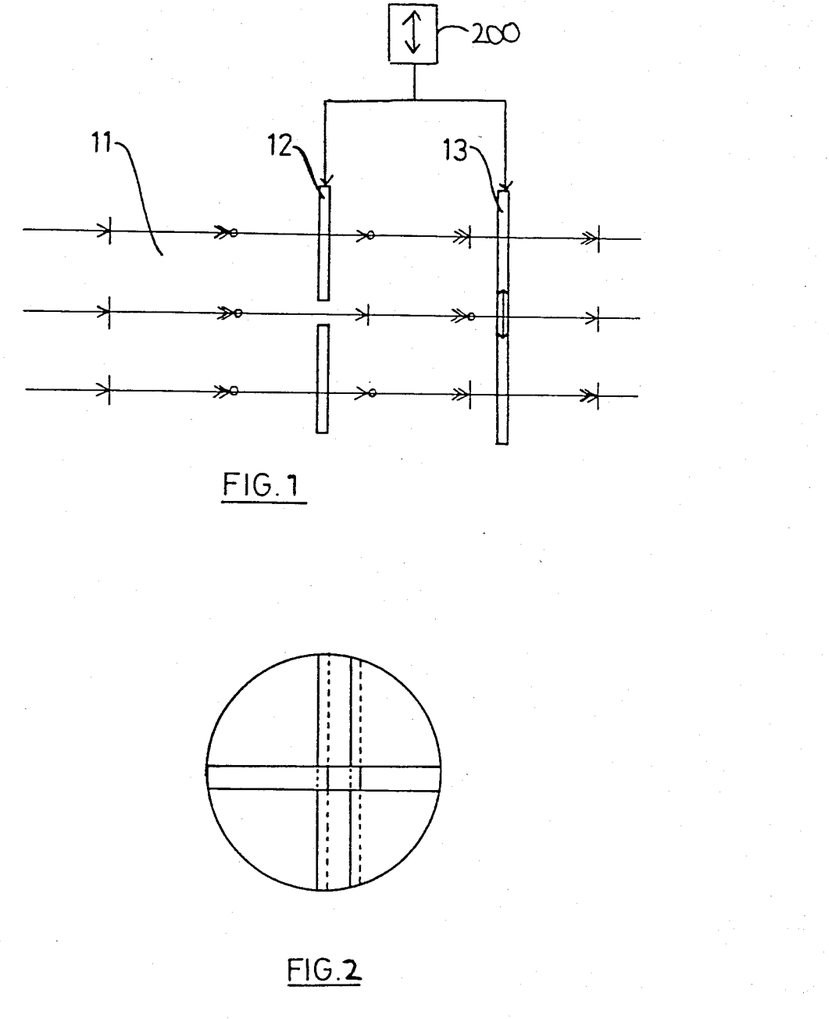
FIG. 1 illustrates a system for alternately suppressing each of the two sheared images of an image-shearing measuring microscope employed in an embodiment of the present invention.
FIG. 2 illustrates an observer's field of view resulting from use of the system of FIG. 1.

In FIG. 1, a beam of light 11 bears a pair of sheared images generated by a microscope's shearing system which may be as described with reference to FIG. 5 below. By virtue of a polarising beam-splitter employed in the shearing system as amplitude dividing means, the two sheared images are polarised respectively in the plane of the diagram and perpendicular thereto, as indicated by the single-barbed and double-barbed rays in the beam 11. The upper and lower pairs of such rays pass through a birefringent half-wave retardation plate 12, diagonally oriented so as to rotate incident planes of polarisation through 90°. However, the central pair of rays pass through a gap formed in the half-wave plate 12, so that its planes of polarisation are unaffected. The beam 11 subsequently reaches an analyser 13 oriented with its transmitting vibration direction parallel to the diagram. The analyser 13 therefore transmits the upper and lower double barbed rays emerging from the half-wave plate 12 and suppresses the single-barbed ones, but exerts the opposite effect on the central pair of rays which have not been modified by 12.

The resulting appearance in the observer's field of view is indicated in FIG. 2, showing line images in continuous lines, the broken-line continuations of the line-images showing their appearance without the effect imparted by the plate 12 and analyser 13. It is, of course, assumed that the half-wave plate is at the image-shearing microscope's image plane, i.e. at the focal plane of an eye-piece (not shown).

In use of the FIG. 1 system, the shear applied by the microscope is adjusted until the line-images in the adjacent regions of the observer's field of view are in abutting alignment, the amount of shear adjustment applied determining the size of an object being measured.

The plate and analyzer 13 may be arranged so that they can be withdrawn from the path of the beam 11 carrying sheared images. For example the plate and analyzer may be carried by a slide, schematically illustrated at 200, moveable so as to place plate 12 and analyzer 13 in the path of beam 11, or withdraw them from that path. With the plate 12 and analyzer 13 withdrawn the microscope functions as a normal image-shearing microscope.

It may be sufficient to withdraw only analyzer 13, but in this case the presence of the plate 12 would still be apparent in the field of view, which may be disadvantageous for ease of observation of the overlapping images provided.

Alternatively, the plate 12 and analyzer 13 may be mounted in a removeable eye-piece body.

Figure 3:
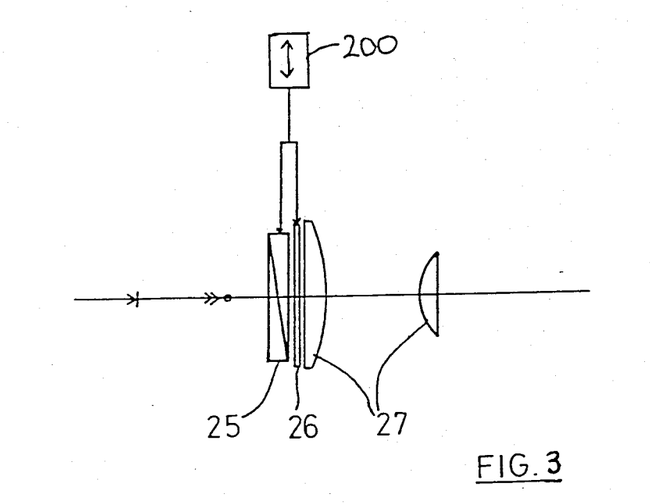
FIGS. 3 and 4 illustrate respective variations of the system of FIG. 1.
Figure 4:
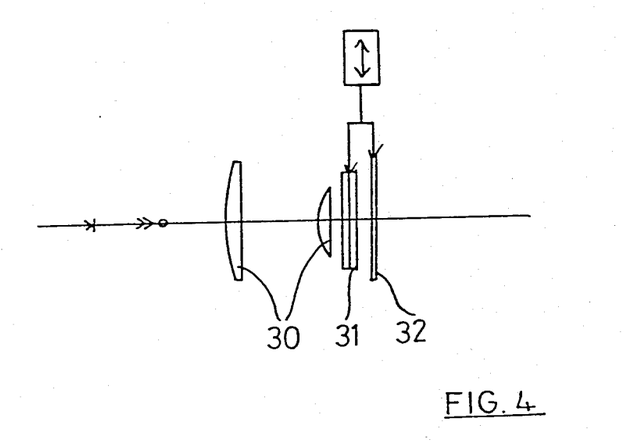

The combination of the half-wave plate 12 and the analyser 13 is equivalent to a familiar optical device known as a half-shadow plate or bi-quartz. A similar end can be achieved if the plate 12 is a wedge of birefringent material producing interference fringes, as shown in FIG. 3, where a wedge 25 is positioned before an analyser 26 and eye-piece 27. Alternatively, there may be used a Savart plate, a well-known birefringent device which produces interference fringes at infinity (and which, clearly, would not be placed at the image plane). If placed downstream of an eye-piece and followed by an analyser, these fringes appear at the eye-piece's focal-plane and have the effect of alternately suppressing the two sheared images in bands across the observer's field of view. FIG. 4 shows such a Savart plate 31 placed downstream of an eye-piece 30 and followed by an analyser 32. It is, however, thought that this could prove confusing and that the half-wave plate method is presently preferred.

In an arrangement of FIG. 3, the wedge 25 and analyser 26 may be withdrawable from the path of beam 11, for example being carried by a moveable slide 200. Similarly, the Savart plate 31 and analyser 32 may be slide mounted for withdrawal. Alternatively, the wedge 25 and analyser 26 may be mounted with eye-piece 27 of FIG. 3 in a removeable eye-piece body, and similarly Savart plate 31 and analyser 32 may be mounted with eye-piece 30 in a removeable eye-piece body. In each case the withdrawal or removal of the image suppression elements (wedge 25, analyser 26; plate 31, analyser 32) allows the microscope to be used as a normal image-shearing microscope.

Of course in a case in which image suppression elements are mounted in a removeable eye-piece body, a replacement eye-piece body, devoid of image suppression elements, will be available for using the microscope in a normal image shearing mode.

The above methods for achieving local, selective alternate suppression of the sheared images require the latter to be differently polarised, e.g. by a polarising beam-splitter employed as amplitude dividing means in the shearing system.

Figure 5:
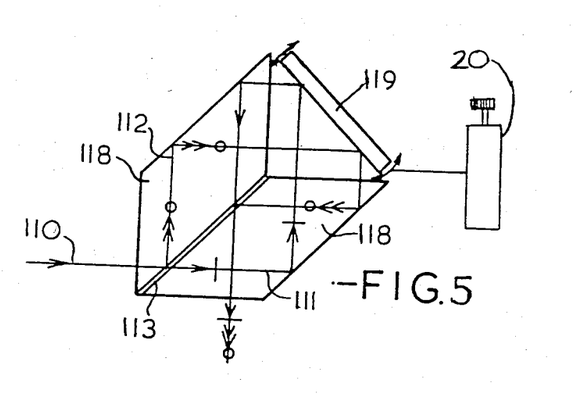
FIG. 5 illustrates a shearing system, using a polarising beam splitter, for use with the systems of FIGS. 1, 3 and 4.

FIG. 5 illustrates a shearing system, employing a polarising beam splitter as amplitude dividing means, suitable for use with the systems of FIGS. 1,3 and 4.

In the shearing system of FIG. 5, two rhomboidal prisms 118 are cemented together. The cemented interface 113 of the prisms 118 bears a polarising beam splitting coating such that an incoming image bearing beam 110 is split by amplitude division into two mutually shearable beams 111 and 112 linearly polarised in mutually perpendicular directions. The two beams are reflected around faces of the prisms 118 and a mirror 119 to emerge as illustrated, as beam 11 bearing a pair of shearable images.

Shearing systems providing shearable images of different polarizations are well known. The system of FIG. 5 is known and is a system substantially as disclosed in U.K. Pat. No. 1,508,806 and U.S. Pat. No. 4,088,410.

However, not all image-shearing systems use beam-splitters providing sheared images of different polarisations. For example, the Vickers' Image Shearing Eyepiece (Dyson-type) uses semi-reflecting metallic beam-splitting coatings for amplitude division in what is basically a Mach-Zehnder configuration and the sheared images it produces do not exhibit the orthogonal polarisation the above methods require. In this particular case, however, the required selective image suppression can be accomplished by a pair of complementary diaphragms suitably located at the respective image planes in the separated beams, as indicated in FIG. 6.

Figure 6:
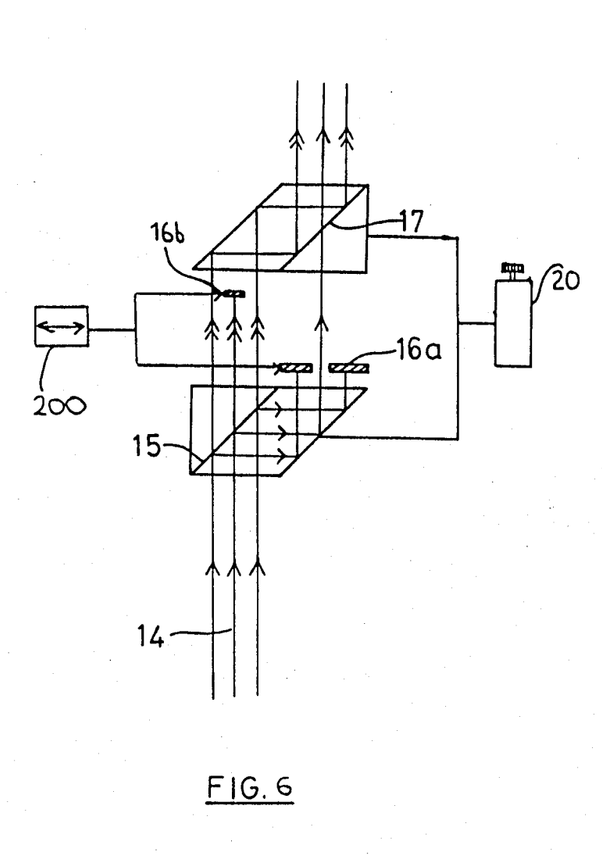
FIG. 6 illustrates another system for alternately suppressing each of the sheared images of an image-shearing measuring microscope employed in an embodiment of the present invention.

In FIG. 6, the single image-bearing beam 14 from the microscope is divided into single-barbed and double-barbed component beams at a cemented beam-splitting surface 15. The central ray of the single-barbed beam passes through a central gap in a diaphragm 16a, located at an image-plane of the microscope, and passes onto an observation system (not shown). The double-barbed rays transmitted through the surface 15 pass to the second image plane, where the central ray is masked out by a complementary strip-like diaphragm 16b. Thereafter, the beams are brought to a common path by a second beam-splitting surface 17, the resulting beam bearing a virtual image presenting a central, single-barbed portion of the field between outer double-barbed portions, as in the previous examples.

By arranging for the diaphragms 16a and 16b to be removable from the paths of the shearable image beams, for example by mounting them in a common slide mechanism as indicated at 200 in FIG. 6, the microscope can be used as a normal image shearing microscope. The slide mechanism 200 may be arranged to move the diaphragms out of the beams in a direction perpendicular to the plane of FIG. 6 to avoid inadvertent occlusion of the beams.

An inconvenience of the embodiment schematically illustrated by FIG. 6 is that the image-planes are too far upstream of the beams' exit window to be focussed by most conventional eye-pieces, so that it may be necessary to include a relay lens system to re-image the image planes downstream of the exit window. Where such a complication is unacceptable it would be possible to modify the shearing system of FIG. 6 in such a way that the diaphragms 16a and 16b would be replaced by the polarising systems of FIGS. 1 and 2 located at an image plane downstream of the beams' exit window. The modification would involve using polarising beam-splitting coatings for amplitude division at 15 and 17 and inserting a diagonally oriented half-wave retardation plate in the paths of both beams between the two cemented rhomboid prisms. The recombined emerging beams would then be polarised in mutually perpendicular planes as required for the system illustrated in FIGS. 1 and 2.

Figure 7:
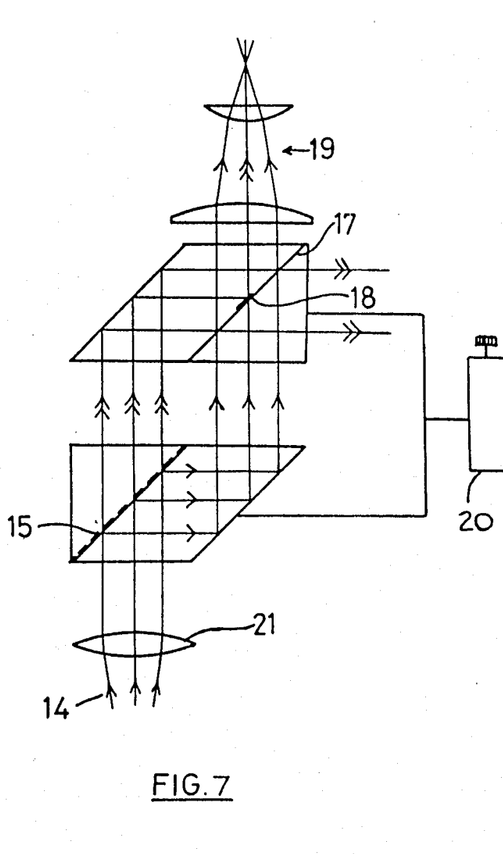
FIG. 7 illustrates a microscope which constitutes a variant of the system of FIG. 6.

An alternative modification to the FIG. 6 system is diagrammatically illustrated in FIG. 7, where a microscope has a field lens 21 which receives light from an objective (not shown).

As before, the image-bearing beam of light 14 is divided into two mutually shearable beams at the beam-splitting interface 15, by amplitude division, but a local region of the field is blocked out by a substantially opaque spot or strip 18 in the cemented prismatic interface 17, the spot or strip 18 now being located at the microscope objective's image plane.

On the other hand, the image carried by the double-barbed rays transmitted throught the interface 15 is locally reflected at the spot or strip 18 which, in addition to being opaque is also light-reflecting. At least one region of the interface 17 immediately adjacent to the spot or strip 18 is substantially non-reflecting and transparent, thus transmitting the single barbed rays in the beam reflected by 15.

As a result, the composite image at the focal plane of a positive eye-piece 19 consists of one localised image element reflected by the spot or strip 18 adjacent to an immediately abutting image element transmitted through the interface 17. Application of relative angular displacement to the two cemented rhomboidal prisms therefore causes the reflected image element to be transversely displaced relative to the transmitted image element. The resulting appearance of the observer's field of view would therefore be similar to that illustrated in FIG. 2. It will be understood that essentially the same result can be achieved by substitution of the small opaque, reflecting region 18 by a transparent area in an otherwise opaque reflecting interface.

In the systems of FIGS. 6 and 7 calibrated adjustment means 20 are provided for relatively angularly displacing the cemented rhomboidal prisms for providing calibrated displacement of image elements.

The systems as illustrated in FIGS. 1 to 7 are particularly useful in dark-ground or differential intereference contrast modes of illumination in which a specimen's edges are high-lighted against a relatively dark background. However, although one purpose of the embodiment is to facilitate measurement with such modes of illumination, there may often be cases where more conventional methods using bright-ground illumination would be preferred. With previously described embodiments it is easy to change from split-field to normal shearing methods of measuring, e.g. by moving the half-wave plate 12 and analyser 13 out of the field of view or by changing the eye-piece in which the plate and analyser may be contained. In the embodiment of FIG. 7, however, there is no easy way of removing the spot or strip 18 and replacing it with a uniform beam-splitting coating. A possible compromise would be to confine 18 and its adjacent transparent area to a relatively small part of the field, the remainder of the interface bearing the usual beam-splitting films.

Figure 8:
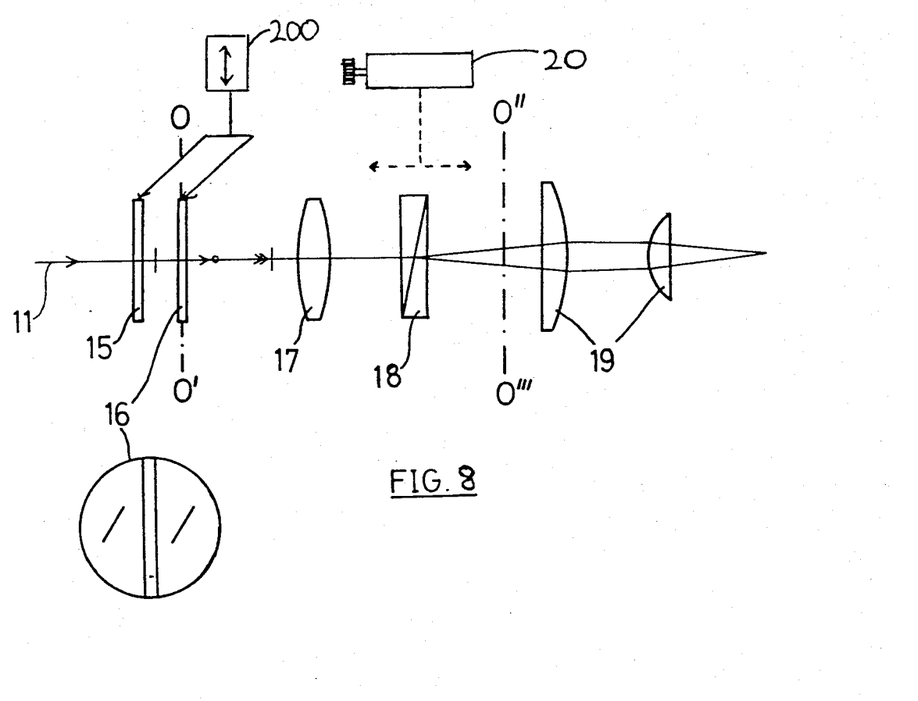
FIG. 8 is an optical diagram of another embodiment of the present invention.

FIG. 8 is a diagrammatic representation of an alternative embodiment of the present invention.

In FIG. 8, a beam 11 focuses the specimen's image onto a first image-plane O—O', after being linearly polarised by a polariser 15. At the plane O—O', there is located a compound component 16 comprising a pair of birefringent half-wave retardation plates with a narrow intervening gap, as indicated by the inset plan view. The half-wave components have their extinction directions diagonally oriented so as to impart a 90-degree rotation. A double-refracting double-image prism constitutes amplitude dividing means. An eye-piece 19 is provided for viewing.

Figure 9:
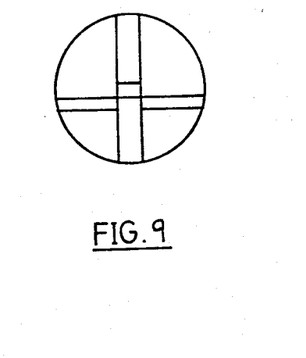
FIG. 9 illustrates an observer's field of view resulting from use of the system of FIG. 8.

The beam 11 emerges linearly polarised from the polariser 15. Rays (shown as double-barbed rays) passing through the gap between the birefringent plates of compound components 16 retain their original vertical polarisation direction imparted by the polariser 15 whilst rays (shown as single-barbed rays) passing through the birefringent plates of the compound component 16 emerge with their polarisation directions rotated into a plane perpendicular to the diagram. A corrected positive lens 17 then images the component 16 onto a second image plane O"—O"'. However the differently polarised portions of the beam reach O'—O"' via transmission through double-refracting, double-image prism 18 (e.g. a Wollaston prism) where they are divergently refracted by virtue of amplitude division. Consequently, the second image-plane O"—O"' contains images which are relatively displaced to an extent proportional to the variable distance of the prism 18 from O"—O"'. Thus, the image displacement can be reduced to zero by moving 18 to O"—O"'. This field can be viewed directly through an eye-piece 19 or, for example, relayed by an additional lens system to a binocular viewing head. A typical appearance of the field when line-separations are being measured as indicated in FIG. 9. Calibrated adjustment means 20 are provided which are operable to move the prism 18 to adjust the relative displacement of the images in the second image-plane O"—O"'. If adjustment is effected until the lower line element in the central part of the field indicated in FIG. 9 is in juxtaposed alignment with the upper line elements in the outer parts of the field illustrated in FIG. 9, the calibrated adjustment required then provides a measure of the separation between the upper and lower line elements.

In the embodiment of FIG. 8, if the polariser 15 and the compound component 16 are slide mounted, as schematically indicated at 200, they may be withdrawn from the beam 11 to allow the microscope to operate in a normal image shearing mode.

In relation to the systems illustrated in FIGS. 1, 3 and 4, using the shearing system of FIG. 5, the shear applied is adjusted by calibrated adjustment means 20 which tilt the mirror 119 about an axis perpendicular to the Figure to impart opposite angular displacement to the two beams 111 and 112, thus providing a required angular shear. By thus adjusting the shear a line element as seen in the central part of the field of view illustrated in FIG. 2 can be brought into juxtaposed alignment with line elements in the outer part of the field of view shown in FIG. 2, thereby to provide a measure of separation between the line elements.

It will be appreciated that the "line elements" mentioned herein may not be straight lines.

It will be appreciated that the accuracy with which an observer can bring line elements into juxtaposed alignment is determined by the eye's vernier acuity, which, as mentioned above, is very high.

The illustrated embodiments of this invention provide a sharp boundary segregation between different parts of the field of view containing line elements to be brought into juxtaposed alignment. Thereby, full use can be made of the eye's vernier acuity.

In the illustrated embodiments the amplitude dividing means employed to provide mutually displaceable image parts are located remotely from the boundary between the image parts.

Calibrated adjustment may permit at least one segment of one line element of an image to be brought into juxtaposed alignment with an adjacent segment of another line element of an image, the calibrated adjustment being a measure of the separation between the two line elements of the imaged objects.

The present invention provides for an enhancement of the precision with which segments of the line elements can be brought into registration.

In the embodiments of the present invention illustrated in FIGS. 1 to 7, in which image-shearing measuring microscopes are employed, in effect, in one portion of an image field one of the two sheared images generated by the shearing system of the microscope is suppressed, whilst in an adjacent portion of the field the other of the two sheared images is suppressed.

The alternate suppression of the two sheared images may advantageously occur at more than one pair of adjacent portions of the field.

No one of the illustrated apparatuses is, of course, restricted to direct visual viewing, and all are readily adaptable to viewing via close circuit television if so desired.

Embodiments of the present invention, except that of FIG. 7, have the advantage that they can easily permit their use in a normal image shearing mode by accommodating elements involved in image suppression, for example, on movable slides, so that they can be withdrawn from beam paths thereby providing the embodiments with flexibility in use.

What I claim is:

1. A measuring microscope, for measuring the distance between line elements of an optical image, the microscope comprising:

amplitude dividing means arranged to receive an image-carrying beam, bearing only the said optical image, and to provide therefrom mutually shearable image beams;

suppression means arranged in the paths of the shearable image beams to suppress respective complementary regions of the shearable image beams, to form respective non-overlapping but adjacent image portions for viewing;

and adjustment means for carrying out calibrated displacement of the image portions relative to one another.

2. A measuring microscope as claimed in claim 1, wherein the suppression means are removeable from the paths of the mutually shearable image beams, whereby, when the suppression means are removed from the paths of the shearable image beams, suppression of respective complementary regions of the mutually shearable image beams does not occur and respective overlapping images are formed for viewing.

3. A measuring microscope, for measuring the distance between line elements of an optical image, the microscope comprising:

amplitude dividing means arranged to receive an image-carrying beam, bearing only the said optical image, and to provide therefrom mutually shearable image beams of respective different polarisation directions;

suppression means arranged to receive the mutually shearable image beams and to suppress respective complementary regions of the mutually shearable image beams, to form respective distinct non-overlapping but adjacent image portions for viewing; and adjustment means for carrying out calibrated displacement of the image portions relative to one another.

4. A measuring microscope according to claim 3, wherein the suppression means comprise at least one birefringent half-wave retardation plate in the path of parts of the mutually shearable image beams, operable to change the polarisation direction of that part of each such image beam which traverses the plate to the polarisation direction of that part of the other such image beam which does not traverse the plate, and a polarisating analyser downstream of the plate.

5. A measuring microscope according to claim 3, wherein the suppression means comprise a wedge of birefringent material in the path of the mutually shearable image beams, and a polarising analyser downstream of the wedge.

6. A measuring microscope according to claim 3, wherein the suppression means comprises a Savart plate in the path of the mutually shearable image beams, and a polarising analyser downstream of the Savart plate.

7. A measuring microscope according to claim 3, wherein the suppression means are removable from the paths of the mutually shearable image beams, whereby, when the suppression means are removed from the paths of the shearable image beams, suppression of respective complementary regions of the mutually shearable image beams does not occur and respective overlapping images are formed for viewing.

8. A measuring microscope, for measuring the distance between line elements of an optical image, comprising:

amplitude dividing means, arranged to receive an image-carrying beam, bearing only the said optical image, and to provide therefrom separated mutually shearable image beams;

suppression means arranged in the paths of the separated mutually shearable image beams to suppress complementary regions of the mutually shearable image beams, to form respective distinct non-overlapping but adjacent image portions for viewing; and adjustment means for carrying out calibrated displacement of the image portions relative to one another.

9. A microscope according to claim 8, wherein the suppression means comprise complementary diaphragms disposed respectively in the paths of the separated mutually shearable image beams.

10. A measuring microscope according to claim 8, wherein the suppression means comprise a substantially opaque and reflecting body, arranged so as to mask a part of one of the separated mutually shearable image beams, by virtue of its opacity, and so as to reflect a part of the other separated mutually shearable image beam into the one separated mutually shearable image beam, in place of the masked part of the one separated mutually shearable image beam.

11. A measuring microscope according to claim 8, wherein the suppression means are removeable from the paths of the mutually shearable image beams, whereby, when the suppression means are removed from the paths of the shearable image beams, suppression of respective complementary regions of the mutually shearable image beams does not occur and respective overlapping images are formed for viewing.

12. A measuring microscope according to claim 8, wherein a boundary between the adjacent respective image portions is substantially conjugate with an image plane of the image portions.

* * * * *